United States Patent [19]
Marti

[11] 3,777,864
[45] Dec. 11, 1973

[54] AIR COOLED MAGNETIC CLUTCH AND BRAKE

[75] Inventor: Willi Hermann Marti, Basel, Switzerland

[73] Assignee: Delmoran AG, Basel, Switzerland

[22] Filed: Dec. 3, 1971

[21] Appl. No.: 204,635

[30] Foreign Application Priority Data
Dec. 15, 1970 Switzerland.................... 18575/70

[52] U.S. Cl. .......................... 192/18 B, 192/113 A
[51] Int. Cl. .......................................... F16d 67/06
[58] Field of Search ................ 192/18 B, 12 D, 48.2

[56] References Cited
UNITED STATES PATENTS

| | | | |
|---|---|---|---|
| 3,581,855 | 6/1971 | Taeffner et al.................. | 192/18 B |
| 3,036,680 | 5/1962 | Jaeshke............................ | 192/84 C |
| 3,368,657 | 2/1968 | Wrensch et al................... | 192/18 B |

*Primary Examiner*—Benjamin W. Wyche
*Attorney*—Michael S. Striker

[57] ABSTRACT

A magnetic friction clutch wherein two disk-shaped armatures are movable axially of and rotate with the driven shaft. One of the armatures is adjacent to a flywheel which is rotated by the output shaft of an electric motor and the other armature is adjacent to a stationary or rotary braking member. Each armature has a ring-shaped nave which is mounted on the driven shaft and a ring-shaped rim which surrounds and is magnetically separated from the respective rim. Annular facings of magnetically non-conductive material are provided on each of the armatures between the respective nave and rim and their exposed surfaces are flush with pole faces provided on the corresponding rim and nave. Two windings are mounted in the space between the two armatures and one thereof is energizable to cause the facing and the pole faces of one armature to bear against the flywheel, the other winding being energizable to cause the facing and the pole faces of the armature to bear against the braking member. Channels in the braking member, naves of the armatures and the flywheel serve to convey streams of cooling air which are induced by annuli of blades on the flywheel. The material of those portions of each rim and nave which are adjacent to the respective pole faces exhibits the same resistance to wear as the material of the facings.

22 Claims, 2 Drawing Figures

AIR COOLED MAGNETIC CLUTCH AND BRAKE

BACKGROUND OF THE INVENTION

The present invention relates to magnetic clutches in general, and more particularly to improvements in magnetic clutches of the type wherein a driving shaft which receives torque from a motor carries a flywheel and can be coupled to or uncoupled from a driven shaft in response to changes in the condition of energization of winding. Still more particularly, the invention relates to improvements in clutches of the type wherein two disk-shaped armatures are disposed between a flywheel and a stationary or rotary braking member and are mounted on the driven shaft to rotate the driven shaft at the speed of the flywheel in response to energization of a first winding which causes one of the armatures to bear against the flywheel and to either decelerate or arrest the driven shaft in response to energization of a second winding which causes the other armature to bear against the braking member.

German printed publication No. 1,265,843 discloses a magnetic clutch wherein the driven shaft carries two fixedly mounted elastic washers for ring-shaped armatures which are disposed between a constantly driven flywheel of the motor and a braking member. The armature surround the respective washers and one thereof is caused to engage the flywheel in response to energization of a first winding with attendant deformation of the respective elastic washer; the other armature bears against the braking member in response to energization of a second winding which results in deformation of the other washer. The flywheel and the braking member carry ring-shaped magnets which can be engaged by ring-shaped friction generating facings which are disposed radially inwardly of the respective armatures. The magnetic forces which cause the facings respectively to bear against the flywheel and the braking member are active only in the regions surrounding the respective facings and the area of contact between the braking member or the flywheel on the one hand and the respective facing on the other hand is relatively small. Therefore, the electromagnets including the windings and the associated armatures must generate substantial forces, especially if the driven shaft is to be rapidly accelerated by the flywheel or rapidly decelerated by the braking member. The power requirements of the electromagnets are further increased due to the fact that the armatures are mounted on elastic washers which must be deformed before the respective facings can be moved into requisite friction generating engagement with adjoining magnets. The efficiency of a clutch is normally defined as the ratio between the transmitted output and the required ampere turn member; such efficiency is very low in the clutches of the just outlined character. Moreover, due to the high number of ampere turns, the magnetic inertia of the clutches is very high so that the switching time (namely, the interval which elapses between the energization of a winding and the desired acceleration or deceleration of the driven shaft) is too long. still further, the friction heat is generated mainly in a region which is disposed radially inwardly of the armatures (because the facings are surrounded by the armatures) and, therefore, such heat cannot be dissipated with a desired degree of efficiency, especially if the windings are to be energized at frequent intervals.

U.S. Pat. No. 3,254,746 discloses a clutch for electric motors which dispenses with the aforediscussed elastic washers. Instead the two armatures are movable axially of but rotate with the driven shaft. Both armatures' are confined in a cup-shaped end bell whose open side faces the flywheel on the driving shaft. The armatures are surrounded by the respective windings so that their diameters, and hence the diameters of the facings (one of which serves to engage the flywheel and the other of which serves to engage the breaking number), are small. Therefore, the efficiency of such clutch is low, their switching times are long and the dissipation of friction heat presents serious problems. Furthermore, the axial length of the clutch is considerable so that the clutch cannot be used in apparatus wherein the motor which drives the flywheel is closely adjacent to the part or parts which receive torque from the driven shaft. The paths for the magnetic flux are very long and the magnetic forces act only upon the radially outwardly located portions of the facings. Therefore, the armature must be stable and hence heavy and bulky in order to insure at least nearly uniform pressure between the facings and the respective magnets on the flywheel and braking member.

SUMMARY OF THE INVENTION

An object of the invention is to provide a novel and improved magnetic friction clutch with two disk-shaped armatures (hereinafter called disks for short) wherein the entire surface of each facing can be brought into uniform friction generating engagement with the adjacent magnet of a rotary or stationary part, such as a flywheel and a stationary or rotary braking member.

Another object of the invention is to provide novel and improved disks for use in a magnetic friction clutch, particularly in a magnetic clutch with two disks which are movable axially of and rotate with the driven shaft.

A further object of the invention is to provide a magnetic friction clutch with novel and improved means for dissipating or leading away heat which is generated in response to energization of one or more windings as well as of such heat which is generated as a result of frictional engagement between a facing and the adjacent rotary stationary part.

An additional object of the invention is to provide a magnetic friction clutch wherein the friction generating areas of the disks are much larger than in presently known clutches without necessitating an overdimensioning of the disks.

Still another object of the invention is to provide a clutch which can furnish extremely short switching times, which can transmit substantial torque with minimal delays, and which occupies less room than presently known clutches with identical torque-transmitting and braking characteristics A further object of the invention is to provide a clutch wherein the wear on the facings is only a small fraction of the wear on the facings of conventional clutches and wherein the width of air gaps between the disks and the adjoining parts remains unchanged even after extremely long periods of use.

The invention is embodied in a structure which comprises coaxial driving and driven shafts whereby the driving shaft constitutes the output elements of an electric or other motor and the driven shaft constitutes the input element of a machine or the like which receives torque from the motor at desired intervals, a flywheel secured to and arranged to rotate with the driving shaft, a fixed or rotary braking member axially spaced from the flywheel, first and second disks disposed between the flywheel and the braking member and being movable axially of but always rotating with the driven shaft, and first and second windings which are respectively energizable to urge annular facings provided on the first and second disks against the flywheel and the braking member so that the driven shaft is rotated at the speed of the driving shaft in response to energization of the first winding and the driven shaft is arrested or rotates at the lesser speed of the braking member in response to energization of the second winding.

In accordance with a feature of the invention, each disk comprises magnetically conductive inner and outer ring-shaped portions which are coaxial with each other and with the driven shaft and are magnetically insulated from each other by plate-like annuli or by one or more slots provided in the disks between their inner and outer portions. The facings are rings which are mounted on the respective disks between the inner and outer ring-shaped portions and have exposed surfaces which are flush with poles faces provided on the corresponding inner and outer ring-shaped portions.

The novel features which are considered as characteristic of the invention are set forth in particular in the appended claims. The improved clutch itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
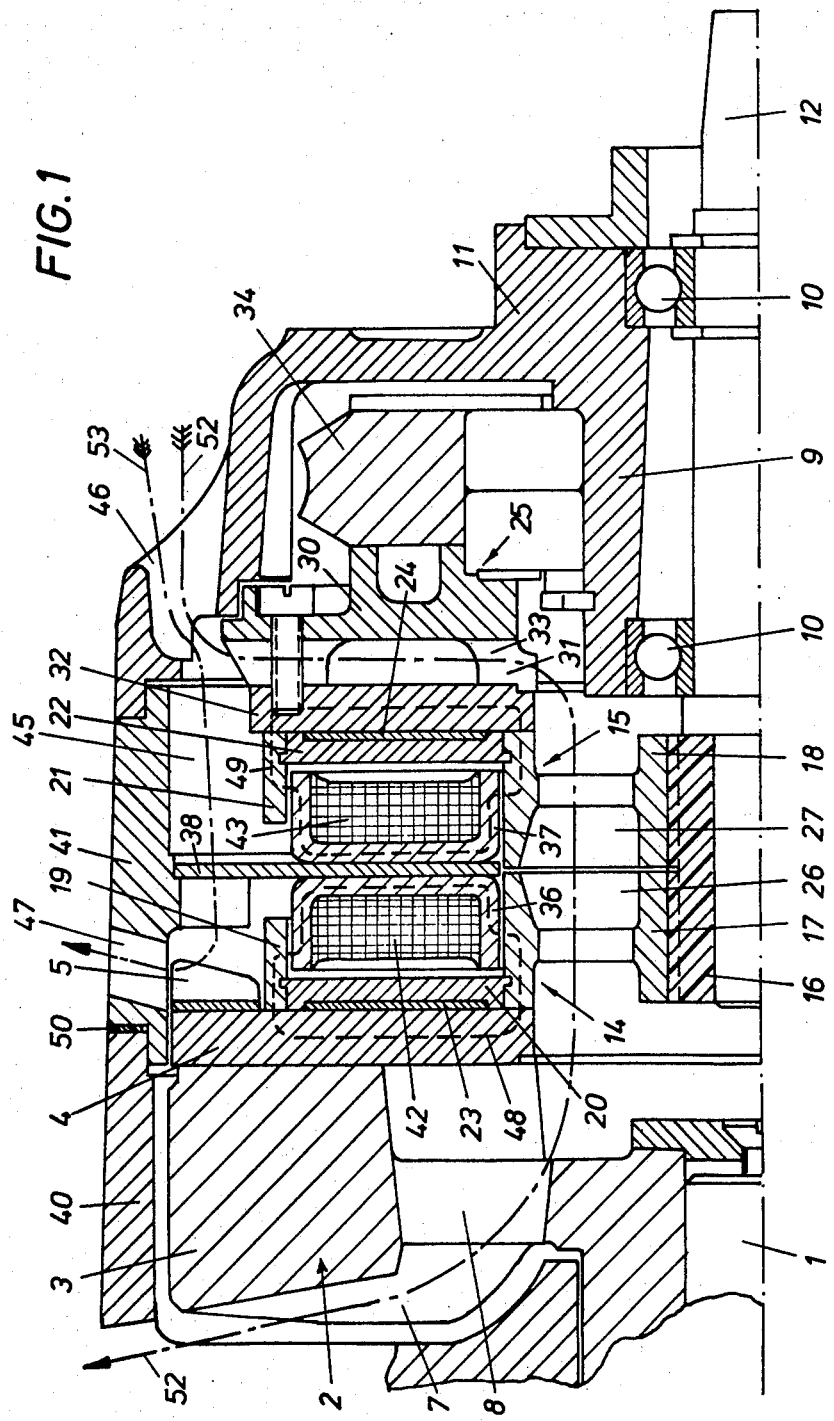
FIG. 1 is an axial sectional view of a magnetic clutch which embodies one form of the invention.

Referring first to FIG. 1, there is shown a portion of an electric motor having an output shaft or driving shaft 1 which is assumed to rotate at a constant speed, e.g., at 3,000 RPM. The output shaft 1 is connected with and rotates a flywheel 2 having a ring-shaped body 3 the right-hand end face of which carries a ring 4 of magnetically conductive material. That end face of the ring 4 which is turned away from the ring-shaped body 3 (i.e., in a direction to the right, as viewed in FIG. 1) has a radially outermost portion provided with an annulus of fan blades or vanes 5. Additional fan blades or vanes 7 are provided on the left-hand end face of the body 3. The flywheel 2 is further provided with an annulus of axially parallel ventilating channels or openings 8.

The housing of the clutch includes an annular portion in the form of a cupped bearing member 11 which has a hub or sleeve 9 for two axially spaced antifriction bearings 10. The inner races of these bearings surround a driven shaft 12 which is coaxial with the output shaft 1 of the motor. The right-hand end portion of the driven shaft 12 can be connected with a pulley (not shown) which can rotate the main shaft of a sewing machine by means of one or more V-belts. It is clear, however, that the sewing machine constitutes but one of a host of machines or apparatus whose main or working shafts can receive torque by way of the improved clutch.

The left-hand end portion of the driven shaft 12 carries two axially movable disk-shaped armatures, namely, a braking disk 15 and a clutch disk 14. These disks share all angular movements of the driven shaft 12. To this end, the left-hand end portion of the driven shaft 12 is rigidly connected with a sleeve 16 the external surface of which is provided with axially parallel splines or with involute teeth mating with complementary splines or teeth of the disks 14 and 15. Such complementary splines or teeth are provided in two ring-shaped inner portions or naves 17, 18 of the disks 14, 15. The sleeve 16 consists of a material of low magnetic conductivity, such as a suitable synthetic plastic substance.

The nave 17 of the disk 14 is concentric with and is spacedly surrounded by an outer ring-shaped portion or rim 19 which is connected with the nave 17 by means of a plate-like annulus 20 consisting of aluminum, another light metal or a synthetic plastic substance.

The nave 18 of the disk 15 is concentric with and is spacedly surrounded by an outer ring-shaped portion or rim 21 which is connected with the nave 18 by means of a plate-like annulus 22 consisting of a light metal or a synthetic plastic substance. The plates 20, 22 are provided with ring-shaped recesses for ring-shaped friction generating facings 23, 24. The exposed surface of the facing 23 is flush with the left-hand end faces of the nave 17 and rim 19, and the exposed surface of the facings 24 is flush with the right-hand end faces of the nave 18 and rim 21. The facing 23 is adjacent to the ring 4 of the flywheel 2 and the facing 24 is adjacent to the magnetically conductive braking ring 32 of a braking member 25 in the bearing member 11.

The portions 17, 19 and 18, 21 of the disks 14, 15 consist of a magnetically conductive material whose resistance to wear preferably closely approximates or equals that of the facings 23, 24. This insures that, when the disk 14 is caused to engage the flywheel 2, the wear on the facing 23 is the same as the wear on the nave 17 and rim 19, as well as that the wear on the facing 24 equals the wear on the nave 18 and rim 21 when the disk 15 is caused to engage the braking member 25. It was found that sintered iron permeated with polytetrafluorethylene is particularly suited for the manufacture of disk portions 17, 18, 19 and 21, and that sintered bronze, also permeated with polytetrafluorethylene, is particularly suited for the manufacture of facings 23 and 24. The naves 17, 18 are respectively provided with axially parallel ventilating channels or openings 26, 27.

The braking member 25 comprises an annular body portion 30 which is provided with projections or ribs 31 extending axially toward the disk 15. The body portion 30 is connected with the magnetically conductive braking ring 32 which can be bolted or screwed to the body portion 30 and has a flat left-hand end face adjacent to the ring 15. Radial cooling channels 33 are defined by the projections 31 between the body portion 30 and the ring 32. The braking member 25 is connected with a worm wheel 34 is rotatably mounted on the sleeve 9 of the bearing member 11. The worm wheel 34 receives torque from a auxiliary motor (not shown) and rotates at a speed which is less than the speed of the output shaft 1. Drive means of the just outlined character are known in the art, for example, from German Patent No. 1,159,745. The rings 4 and 32 preferably consist of hardened steel and are provided with flat end faces which respectively face the disks 14 and 15.

The annular space between the plates 20, 22, rims 19, 21 and naves 17, 18 accommodates a stationary frame for two ring-shaped windings 42, 43. The frame has a substantially I-shaped cross-sectional outline and comprises two profiled sheet metal rings 36, 37 whose inner flanges are respectively adjacent to have naves 17, 18, whose outer flanges are respectively adjacent to the rims 19, 21 and whose webs are adjacent to each other. The webs of the profiled rings 36, 37 are welded or otherwise secured to the opposite sides of a ring-shaped plate-like carrier 38 which is secured to an annular intermediate portion 41 of the clutch housing. The annular portion 41 is disposed between the bearing member 11 and an annular housing portion 40 surrounding the motor which includes the output shaft 1. As shown in FIG. 1, the carrier 38 is located in a plane which is normal to the common axis of the shafts 1, 12 and with respect to which the disks 14, 15 are at least substantially mirror symmetrical to each other. The windings 42, 43 are respectively mounted in the profiled rings 36, 37.

The entire internal surfaces of the inner flanges of profiled rings 36, 37 are respectively adjacent to but slightly spaced from the external surfaces of the naves 17, 18. The rims 19, 21 are slightly spaced from the external surfaces of the outer flanges of profiled rings 36, 37 and each of these rims overlaps a substantial portion of the respective external surface, i.e., though the rims 19, 21 do not extend all the way to the carrier 38, they still define with the outer flanges of the rings 36, 37 an annular air gap of considerable axial length. The thickness of the rims 19, 21 is selected in such a way that the width of air gaps between these rims and the outer flanges of the profiled rings 36,37 equals or closely approximates the width of air gaps between the inner flanges of the rings 36, 37 and the external surfaces of the naves 17, 18. Axially parallel cooling channels 45 extend between the rims 19, 21 and the annular housing portion 41; such channels communicate with each other by way of cutouts or windows (not shown) in the carrier 38. The right-hand channels 45 further communicate with air-admitting inlet openings 46 in the bearing member 11 and the left-hand channels 45 further communicate with air-evacuating outlet openings 47 in the annular housing portion 41.

The provision of air gaps having a substantial length, as considered in the axial direction of the disks 14 and 15, is desirable because such gaps reduce the magnetic resistance and scattering so that the clutch can operate properly with a relatively small number of ampere turns. The mounting of the frame 36-38 for the windings 42, 43 in the annular space between the disks 14, 15 is desirable because the frame occupies little room, because the frame occupies room which is available in the housing of the clutch, and also because such mounting of the windings 42, 43 insures short paths for the magnetic lines of force.

The operation

If the winding 42 in the left-hand profiled ring 36 is energized in a manner not forming part of the present invention, there develops a magnetic flux which surrounds the winding 42 and is indicated by the broken line 48. Such flux passes radially through the ring 36, across the axially parallel air gap between the inner flange of the ring 36 and the nave 17, axially through the nave 17, across the radially extending gap between the left-hand end face or pole face of the nave 17 and the magnetically conductive ring 4, radially through the ring 4, across the radially extending gap between the ring 4 and the left-hand end face or pole face of the rim 19, axially through the rim 19, and back into the ring 36 across the axially parallel air gap between the rim 19 and the outer flange of the ring 36. Consequently, the disk 14 is forced against the flywheel 2, i. e., the pole faces of the nave 17 and rim 19 as well as the exposed surface of the facing 23 are caused to bear against the smooth right-hand end face of the ring 4. Thus, the disk 14 couples the flywheel 2 (and hence the output shaft 1) with the driven shaft 12 which then rotates at the speed of the shaft 1. The plate 20 prevents a magnetic short-circuiting of the disk 14, i. e., a direct passage of magnetic flux from the nave 17 to the rim 19 of the disk 14 without passing radially through the ring 4.

The magnetic forces which transmit torque from the output shaft 1 to the driven shaft 12 are effective radially inwardly as well as radially outwardly of the facing 23. This will be readily understood upon perusal of the preceding description of the magnetic flux (line 48) which develops when the winding 42 is energized. Such distribution of magnetic forces in response to energization of the winding 42 insures that all portions of the facing 23 are passed against the ring 4 with the same force, even if the mechanical stability (and hence the weight and inertia) of the disk 14 is low. This is desirable because a uniform distribution of forces insures equal wear on all portions of the disk 14 which engage the ring 4.

The low weight (and hence the low average or median inertia radius) of the disk 14 is further attributable to the fact that the plate 20 which connects the nave 17 with the rim 19 consists of light metal or a lightweight synthetic plastic material. The combined area of friction generating surfaces (on the ring 4 and portions 17, 19 of the disk 14) is very large which is desirable in order to insure the transmission of substantial torque when the winding 42 is energized. The provision of such large friction generating surfaces is due to the fact that the exposed surface of the facing 23 is flush with the pole faces of the nave 17 and rim 19 and also because the wear on the facing 23 is at least substantially identical with the wear on the disk portions 17, 19. Consequently, the combined area of friction generating surfaces on the parts 17, 23, 19 remains unchanged even after extensive use of the clutch. The paths for the magnetic flux are very short and such paths are substantially symmetrical to the median radius of the facing 23. Due to the fact that the pole faces of the disk portions 17, 19 are flush with the exposed surface of the facing 23, and also because each of the parts 17, 23, 19 consists of a metallic carrier for a synthetic plastic lubricant, the width of the axially parallel air gaps between the flanges of the profiled ring 36 and the portions 17, 19 of the disk 14 can be maintained at an extremely low value which is highly desirable in many types of magnetic friction clutches, i.e., in all those clutches wherein the magnetic resistance of the paths for magnetic flux should be held to a minimum. Consequently, relatively small magnetic forces suffice to insure the transmission of substantial torque with extremely short switching times (i.e., the length of intervals which elapse between energization of the winding 42 and the rotation of driven shaft 12 at the exact speed of the output shaft 1).

The situation is analogous when the winding 43 is energized to cause the exposed surface of the facing 24 and the pole faces of the nave 18 and rim 21 to bear against the smooth left-hand end face of the magnetically conductive ring 32 which forms part of the braking member 25. The magnetic flux which develops on energization of the winding 43 is indicated by the broken line 49.

The width of the radial air gap between the ring 4 and the disk 14 can be varied by removal or insertion of one or more suitable shims or analogous inserts 50 between the adjacent radially extending surfaces of the housing portions 40 and 41. The width of the radial air gap between the ring 32 and the disk 15 can be changed by inserting or removing one or more shims or analogous inserts (not shown) between the annular housing portions 11 and 41.

The heat which develops in the winding 42 or 43, as well as the heat which develops when the disk 14 or 15 is respectively caused to engage the ring 4 or 32 (so that the driven shaft 12 respectively rotates at the speed of the output shaft 1 or the worm wheel 34) can be readily led away by streams of air which are circulated in response to rotation of the flywheel 2, i.e., when the motor including the shaft 1 is on. Such air streams are caused to flow around at least one side but preferably along opposite sides of each such part which is particularly affected by heat. Thus, a first cooling air stream 52 is induced by the blades 7 of the continuously rotating flywheel 2 and is caused to flow from the inlet opening 46 of the bearing member 11 into the radial channels 33 of the braking member 25. Such air stream is drawn through the ventilating channels 27, 26 of the naves 18, 17 and through the channels 8 of the flywheel 2 to flow along the left-hand side of the flywheel through one or more outlet openings of the housing portion 40. A second cooling air stream 53 is induced by the blades 5 of the ring 4 to flow from the inlet openings 46 through the channels 45 to leave the magnetic clutch by way of the outlet openings 47 in the annular housing portion 41.

The facings 23, 24 could be made of cork impregnated with oil or grease in a manner known from the art. However, the aforedescribed facings are preferred because their resistance to volumetric changes in response to changes in temperature, their resistance to wear, and their resistance to permanent deformation in response to sudden mechanical stresses are much more satisfactory than the resistance of cork facings. Thus, by utilizing sintered bronze or another sintered metal which is magnetically non-conductive and which is impregnated with polytetrafluorethylene or another suitable synthetic plastic lubricant, the width of the gaps between the facings 23, 24 and the adjacent surfaces of the rings 4, 32 can be reduced to a small fraction of the width which is necessary if the facings consist of cork. The combined area of the exposed surfaces of facings 23, 24 and the pole faces of the respective naves and rims 17, 19 and 18, 21 is very large so that even though the disks 14, 15 are of lightweight construction, they can insure practically instantaneous acceleration or deceleration of the driven shaft 12, depending upon whether the energized winding 42 causes the disk 14 to bear against the ring 4 of the flywheel 2 or the energized winding 43 causes the disk 15 to bear against the ring 32 of tne braking member 25. Since the wear of the material of the naves 17, 18 and rims 19, 21 (or at least of those parts of such rims and naves which are adjacent to the respective pole faces) is preferably identical with the wear on the facings 23, 24, the area of the exposed surfaces of facings 23, 24 plus the area of pole faces of the disk portions 17, 19 and 18, 21 remains practically unchanged, even after extended periods of use of the clutch.

Proper cooling of the flywheel 2, disks 14, 15 and braking member 25 is of particular importance when the clutch of FIG. 1 is engaged or disengaged at frequent intervals, for example, when the clutch is interposed between an electric motor and an industrial sewing machine. The aforedescribed cooling channels have been found to be highly effective to insure rapid withdrawal of heat which develops as a result of friction between the disks 14, 15 and the parts 2, 25 as well as such heat which develops in response to energization of the windings 42, 43. The cooling air stream 53 which is induced by the blades 5 at the right-hand side of the flywheel 2 cools the radially outermost parts of the disks 14, 15 by flowing along the rims 19, 21, whereas the air stream 52 which is induced by the blades 7 and the left-hand side of the flywheel 2 cools the braking member 25, the inner portions of disks 15, 14 and the flywheel 2.

Figure 2:
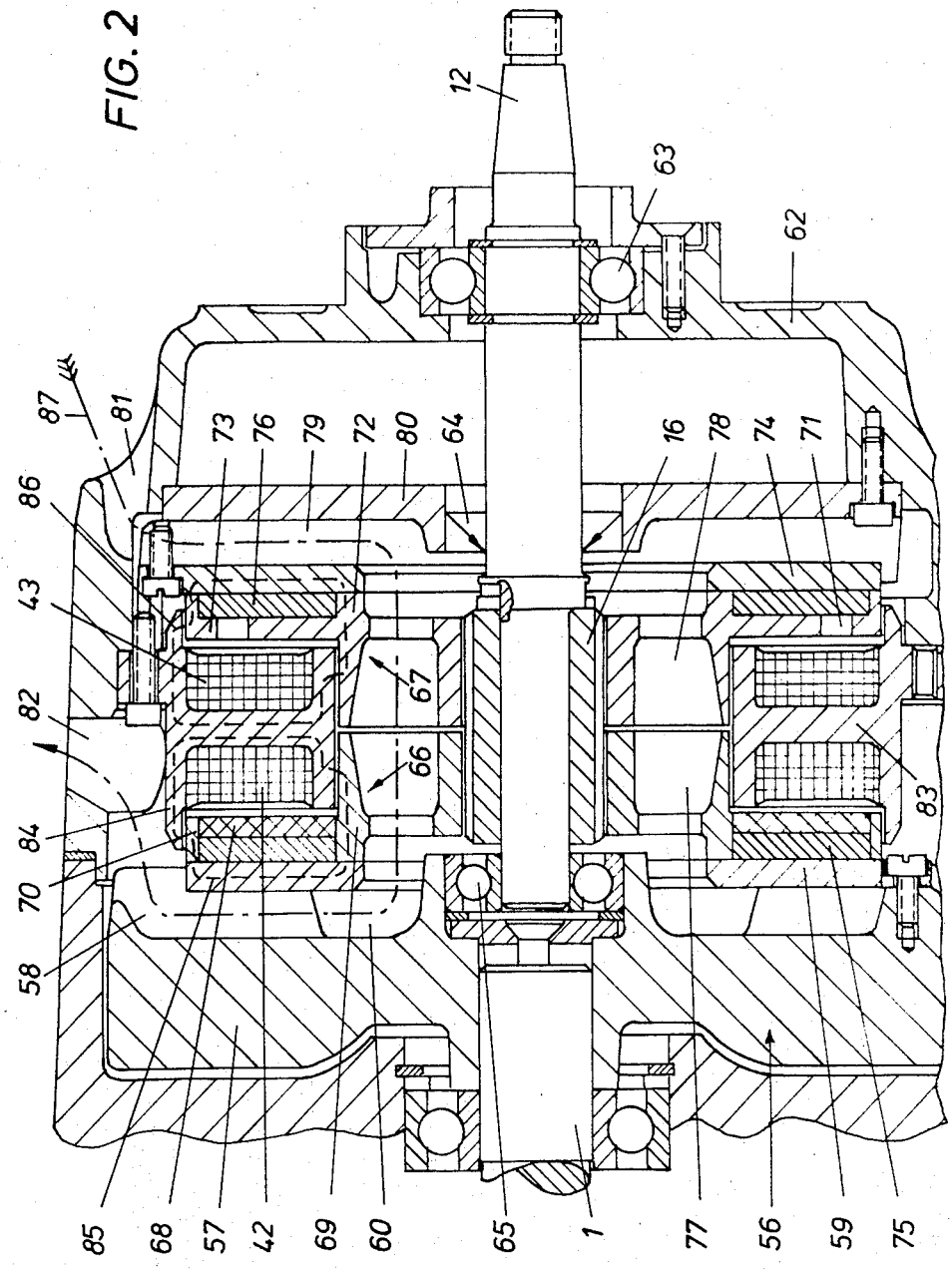
FIG. 2 is an axial sectional view of a modified magnetic clutch.

The clutch of FIG. 2 comprises a modified coupling disk 66 and a modified braking disk 67. The output shaft or driving shaft 1 of the electric motor drives a flywheel 56 having a ring-shaped body 57 the right-hand end face of which is provided with vanes or blades. A magnetically conductive ring 59 is secured to the body 57 in such a way that the parts 57, 59 define radially extending ventilating channels 60. The ring 59 can be screwed or bolted to the body 57.

An annular bearing member 62 which constitutes a portion of the clutch housing accommodates two of three antifriction bearings 63, 64, 65 for the driven shaft 12. The bearing 65 is mounted in the hub of the flywheel 56. The left-hand end portion of the driven shaft 12 is rigidly connected with an externally splined plastic sleeve 16 which rotates with but permits limited axial movements of the disks 66 and 67. The clutch disk 66 comprises a ring-shaped inner portion or nave 69 and a concentric outer ring-shaped portion or rim 70. The ring-shaped portions 69, 70 are connected to each other by a plate-like plastic annulus 68. The braking disk 67 is provided with an annulus of axially parallel elongated holes or slots 71 which are located between a ring-shaped inner portion or nave 72 and an outer ring-shaped portion or rim 73 which is magnetically insulated from the inner portion 72, at least to a substantial degree. The disks 66, 67 are located between the flywheel 56 and a stationary braking member 74. Those end faces of the ring-shaped portions 69, 70 and 72, 73 which respectively face the flywheel 56 and the braking member 74 constitute pole faces and are provided with annular recesses for ring-shaped friction generating facings 75, 76. The exposed surfaces of the facings 75, 76 are flush with the respective pole faces. The ring-shaped portions 69, 70 and 72, 73 preferably consist of sintered iron which is permeated with a synthetic plastic lubricant, such as polytetrafluoroethylene. The facings 75, 76 preferably consist of sintered bronze which is also permeated with polytetrafluoroethylene.

The disks 66, 67 are further provided with axially parallel cooling channels 77, 78 which communicate with the channels 60 of the flywheel 56 and with radially extending cooling channels 79 which are provided between the braking member 74 and a plate 80. The braking member 74 is screwed or bolted to the bearing member 62 and the plate 80 is also screwed or bolted to the bearing member 62 and supports the median antifriction bearing 64 for the driven shaft 12. the bearing member 62 is formed with annuli of preferably equidistant air-admitting inlet openings 81 and with axially spaced air-evacuating or outlet openings 82.

The annular space between the disks 66, 67 accommodates a frame 83 for the two ring-shaped windings 42, 43. The winding-supporting portion of the frame 83 has a substantially I-shaped cross-sectional outline and comprises two halves which are at least nearly mirror symmetrical with reference to a plane which is normal to the common axis of the shafts 1, 12 and extends midway between the disks 66, 67. The frame 83 is connected with the bearing member 62 by means of screws, bolts or analogous fasteners. The radially outermost portion or flange 84 of the frame 83 is concentric with and surrounds the rims 70, 73 of the disks 66, 67 with minimal clearance. It will be noted that portions of the rims 70, 73 extend axially beyond the respective ends of the flange 84.

The operation of the structure shown in FIG. 2 is generally identical with the operation of the structure shown in FIG. 1. When the winding 42 is energized, the disk 66 is caused to adhere to the flywheel 56 by a magnetic flux which is indicated by the broken line 85. This insures that the driven shaft 12 rotates at the exact speed of the output shaft 1 because the disk 66 cannot rotate with reference to the sleeve 16 which is rigid with the shaft 12. When the winding 43 is energized, the disk 67 is attracted to the braking member 74 by a magnetic flux which is indicated by the broken line 86. The shaft 12 is then arrested because the braking member 74 is stationary in contrast to the braking member 25 of FIG. 1 which is assumed to rotate at a speed less than the speed of the output shaft 1. The blades 58 of the continuously driven flywheel 56 induce a cooling air stream 87 which enters the clutch housing by way of the inlet openings 81 and passes through the radial channels 79 behind the braking member 74, thereupon through the axially parallel channels 78, 77 of the disks 67, 66 and radial channels 60 of the flywheel 56 to be discharged by way of the outlet openings 82.

The mass of the disks 66, 67 can be reduced still further if the inner portions of the naves 69, 72 are made of light metal or a lightweight synthetic plastic material. Thus, those portions of the disks 66, 67 which are splined to transmit torque or braking force to the plastic sleeve 16 on the driven shaft 12 can be made of a material whose specific weight is substantially less than the specific weight of remaining outer parts of the disks. The channels 77, 78 can be provided in the just mentioned plastic portions of the disks 66, 67. Such plastic portions are pressfitted into or otherwise securely affixed to the magnetically conductive outer portions of the respective disks.

Without further analysis, the foregoing will so fully reveal the gist of the present invention that others can, by applying current knowledge, readily adapt it for various applications without omitting features which fairly constitute essential characteristics of the generic and specific aspects of my contribution to the art, therefore, such adaptations should and are intended to be comprehended within the meaning and range of equivalence of the claims.

What is claimed as new and desired to be protected by Letters Patent is set forth in the appended

1. A structure of the character indicated, comprising coaxial driving and driven shafts; a flywheel secured to said driving shaft; a braking member axially spaced from said flywheel; first and second disks disposed intermediate said flywheel and said braking member and axially movable secured to and rotatable with said driven shaft, each of said disks comprising magnetically conductive concentric inner and outer ring-shaped portions, means for magnetically insulating said ring-shaped portions from each other and a friction generating facing between said inner and outer portions, the facing of said first disk being adjacent to said flywheel and the facing of said second disk being adjacent to said braking member, the facings of said first and second disks respectively comprising exposed surfaces adjacent to said flywheel and said braking member and said inner and outer portions of said disks having pole faces which are flush with the exposed surfaces of the respective facings, said facings and said inner and outer portions of said disks consisting of materials having at least substantially identical resistance to wear; and a pair of windings energizable to respectively urge the facings of said first and second disks against said flywheel and said braking member.

2. A structure as defined in claim 1, wherein said windings are annular windings which are coaxial with said shafts and further comprising stationary frame means mounting said windings between said disks.

3. A structure as defined in claim 1, wherein said facings are ring-shaped.

4. A structure as defined in claim 1, wherein said disks define an annular space the radially innermost portion of which is flanked by the inner portions of said disks and further comprising stationary frame means extending into said space and supporting said windings.

5. A structure as defined in claim 4, wherein said frame means comprises a ring-shaped portion of I-shaped profile and including inner and outer flange means which are respectively adjacent to said inner and outer portions of said disks.

6. A structure as defined in claim 5, wherein said inner flange means surrounds said inner portions of said disks and said other flange means is surrounded by said outer portions of said disks.

7. A structure as defined in claim 1, wherein said pole faces of said inner and outer portions of said first and second disks respectively engage said flywheel and said braking member in response to energization of the respective windings.

8. A structure as defined in claim 1, wherein said flywheel, said braking member and said disks are provided with communicating channels and said flywheel comprises means for inducing the flow of at least one stream of cooling air through said channels in response to rotation of said driving shaft.

9. A structure as defined in claim 1, further comprising blade means provided on said flywheel for inducing the flow of at least one stream of cooling air through axially parallel channels provided in the inner portions of said disks in response to rotation of said driving shaft.

10. A structure as defined in claim 1, further comprising blade means provided on said flywheel to induce the flow of at least one cooling air stream along the outer portions of said disks in response to rotation of said driving shaft.

11. A structure as defined in claim 1, wherein said facings are respectively separated from said flywheel and said braking member by air gaps of predetermined width in deenergized condition of the respective windings, and further comprising adjusting means for varying the width of said air gaps.

12. A structure as defined in claim 1, wherein said means for magnetically insulating comprises plate-like annuli disposed between the the inner and outer ring-shaped portions of the respective disks, said facings being attached to the respective plate-like annuli.

13. A structure as defined in claim 12, wherein said plate-like annuli consist of light metal.

14. A structure as defined in claim 12, wherein said plate-like annuli consist of synthetic plastic material.

15. A structure of the character indicated, comprising coaxial driving and driven shafts; a flywheel secured to said driving shaft; a braking member axially spaced from said flywheel; first and second disks disposed intermediate said flywheel and said braking member and axially movably secured to and rotatable with said driven shaft, each of said disks comprising magnetically conductive concentric inner and outer ring-shaped portions, means for magnetically insulating said ring-shaped portions from each other and a friction generating facing between said inner and outer portions, the facing of said first disk being adjacent to said flywheel and the facing of said second disk being adjacent to said braking member; and a pair of windings energizable to respectively urge the facings of said first and second disks against said flywheel and said braking member, said inner and outer portions of said first and second disks comprising pole faces which respectively engage said flywheel and said braking member in response to energization of the respective windings, at least those parts of said inner and outer portions of at least one of said disks which are adjacent to the respective pole faces consisting of magnetically conductive sintered metal which is impregnated with a synthetic plastic lubricant.

16. A structure as defined in claim 15, wherein said metal is iron and said lubricant is polytetrafluoroethylene.

17. A structure of the character indicated, comprising coaxial driving and driven shafts; a flywheel secured to said driving shaft; a braking member axially spaced from said flywheel; first and second disks disposed intermediate said flywheel and said braking member and axially movably secured to and rotatable with said driven shaft, each of said disks comprising magnetically conductive concentric inner and outer ring-shaped portions, means for magnetically insulating said ring-shaped portions from each other and a friction generating facing between said inner and outer portions, each of said facings consisting of a magnetically nonconductive sintered metal which is impregnated with a synthetic plastic lubricant, the facing of said first disk being adjacent to said flywheel and the facing of said second disk being adjacent to said braking member; and a pair of windings energizable to respectively urge the facings of said first and second disks against said flywheel and said braking member.

18. A structure as defined in claim 17, wherein said metal is bronze and said lubricant is polytetrafluoroethylene.

19. A structure of the character indicated, comprising a housing; coaxial driving and driven shafts; a flywheel located in said housing and secured to said driving shaft; a braking member located in said housing and axially spaced from said flywheel, said housing comprising a first annular portion supporting said flywheel and said driving shaft and a second annular portion supporting said driven shaft; first and second disks in said housing, said disks being disposed intermediate said flywheel and said braking member and being axially movably secured to and rotatable with said driven shaft, each of said disks comprising magnetically conductive concentric inner and outer ring-shaped portions, means for magnetically insulating said ring-shaped portions from each other and a friction generating facing between said inner and outer portions, the facing of said first disk being adjacent to said flywheel and the facing of said second disk being adjacent to said braking member; a pair of windings energizable to respectively urge the facings of said first and second disks against said flywheel and said braking member, said facings being respectively separated from said flywheel and said braking member by air gaps of predetermined width in deenergized condition of the respective windings; and adjusting means for varying the width of said air gaps, said adjusting means comprising at least one insert removably interposed between said first and second annular portions of said housing.

20. A structure of the character indicated, comprising a housing; coaxial driving and driven shafts; a flywheel located in said housing and secured to said drive shaft; a braking member located in said housing and axially spaced from said flywheel; first and second disks in said housing, said disks being disposed intermediate said flywheel and said braking member and being axially movably secured to and rotatable with said driven shaft, each of said disks comprising magnetically conductive concentric inner and outer ring-shaped portions, means for magnetically insulating said ring-shaped portions from each other and a friction generating facing between said inner and outer portions, the facing of said first disk being adjacent to said flywheel and the facing of said second disk being adjacent to said braking member, said housing comprising a first annular portion supporting said braking member and a second annular portion supporting said second disk; a pair of windings energizable to respectively urge the facings of said first and second disks against said flywheel and said braking member, said facings being respectively separated from said flywheel and said braking member by air gaps of predetermined width in deenergized condition of the respective windings; and adjusting means for varying the width of said air gaps, said adjusting means comprising at least one insert removably received between said annular portions of said housing.

21. A structure of the character indicated, comprising coaxial driving and driven shafts; a flywheel secured to said driving shaft; a braking member axially spaced from said flywheel; first and second disks disposed intermediate said flywheel and said braking member and axially movably secured to and rotatable with said driven shaft, each of said disks comprising magnetically conductive concentric axially extending inner and outer ring-shaped portions and said inner portions of said disks being provided with channels, means for magnetically insulating said ring-shaped portions from each other and a friction generating facing between said inner and outer portions, the facing of said first disk being adjacent to said flywheel and the facing of said second disk being adjacent to said braking member; a pair of windings energizable to respectively urge the facings of said first and second disks against said flywheel and said braking member; and means including first and second blade means provided on said flywheel and respectively arranged to induce the flow of at least one first cooling air stream axially along said outer ring-shaped portions of said disks and at least one second cooling air stream through said channels of said inner portions of said disks.

22. A structure as defined in claim 21, wherein said flywheel has a first side facing said first disk and a second side opposite said first side, said first and second blade means being respectively provided at said first and second sides of said flywheel.

* * * * *